(12) United States Patent
Ohwaku

(10) Patent No.: US 11,863,717 B2
(45) Date of Patent: Jan. 2, 2024

(54) IMAGE READING APPARATUS AND IMAGE READING METHOD

(71) Applicant: SHARP KABUSHIKI KAISHA, Sakai (JP)

(72) Inventor: Takeshi Ohwaku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/684,790

(22) Filed: Mar. 2, 2022

(65) Prior Publication Data

US 2022/0294912 A1 Sep. 15, 2022

(30) Foreign Application Priority Data

Mar. 11, 2021 (JP) ................................ 2021-039377

(51) Int. Cl.
  *G06F 3/12* (2006.01)
  *H04N 1/00* (2006.01)

(52) U.S. Cl.
  CPC ....... *H04N 1/0044* (2013.01); *H04N 1/00005* (2013.01); *H04N 1/00068* (2013.01); *H04N 1/00824* (2013.01); *H04N 2201/0081* (2013.01); *H04N 2201/0094* (2013.01)

(58) Field of Classification Search
  CPC ............ H04N 1/0044; H04N 1/00005; H04N 1/00068; H04N 1/00824; H04N 2201/0081; H04N 2201/0094
  See application file for complete search history.

(56) References Cited

U.S. PATENT DOCUMENTS

2018/0167518 A1* 6/2018 Muraishi ............ H04N 1/00803
2022/0166893 A1* 5/2022 Hamashima ....... H04N 1/00811

FOREIGN PATENT DOCUMENTS

JP 2010-258798 A 11/2010

* cited by examiner

*Primary Examiner* — Moustapha Diaby
(74) *Attorney, Agent, or Firm* — ScienBiziP, P.C.

(57) ABSTRACT

An image reading apparatus includes: a scanner unit that scans a document including a plurality of pages and reads an image of each of the pages; an image processing unit that determines characteristics of each page of the read images and performs image processing in accordance with the characteristics; a display device that previews the processed image of each page; an operation detection device that accepts a setting of an extraction condition related to the characteristics; and a controller that extracts, based on the set extraction condition, and previews a read image of a page having determination accuracy pertaining to the characteristics below a predetermined standard among the images processed for each page.

7 Claims, 16 Drawing Sheets

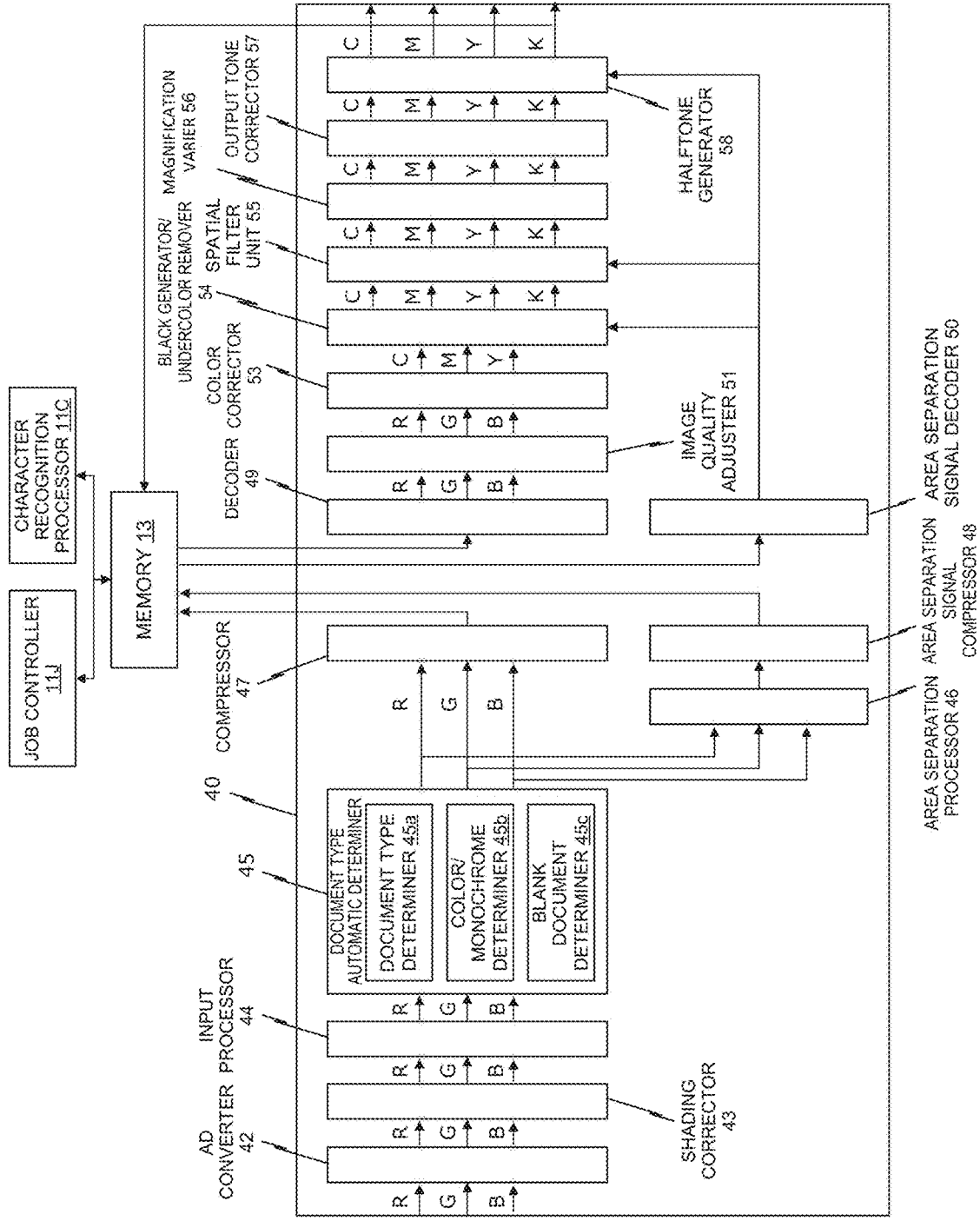

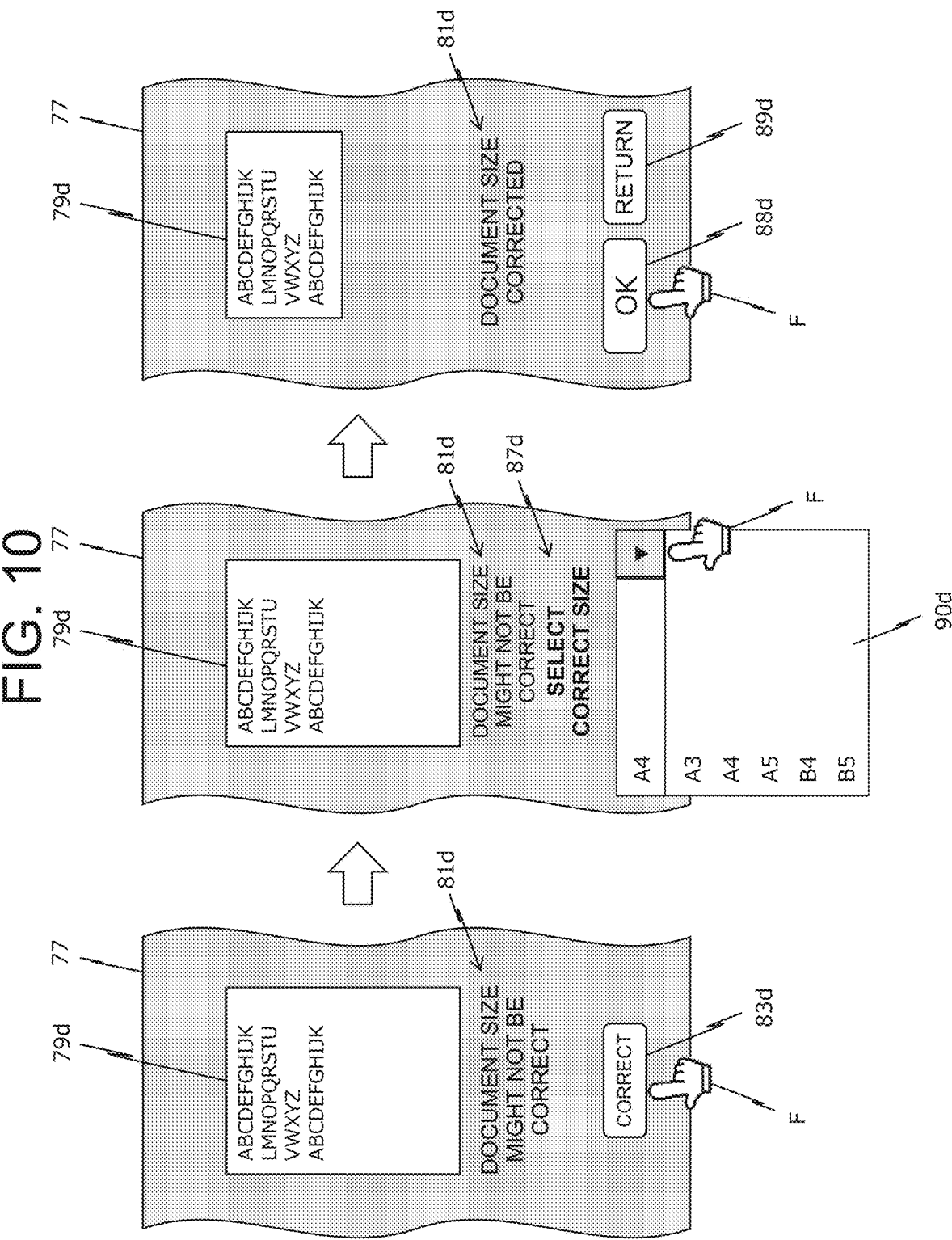

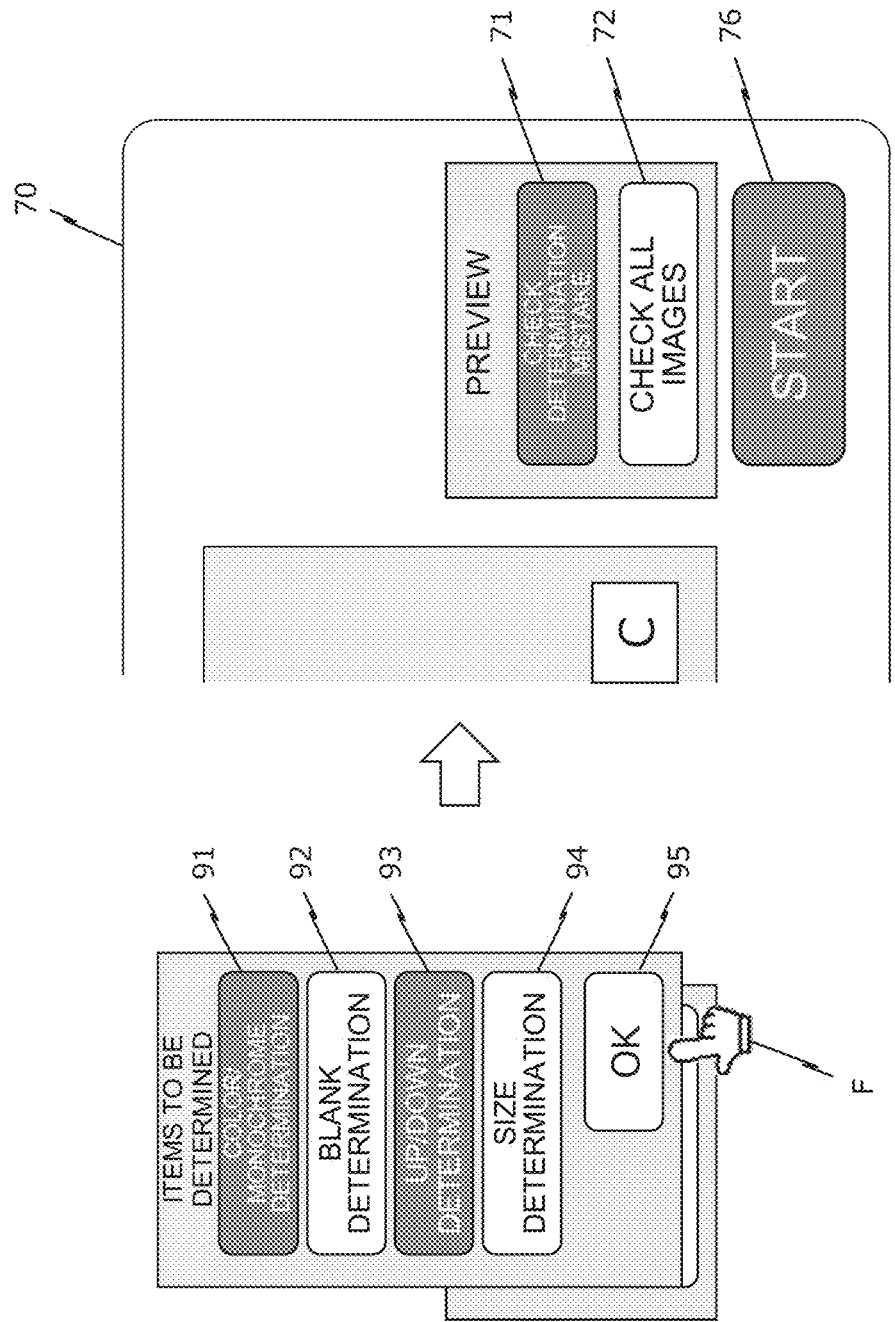

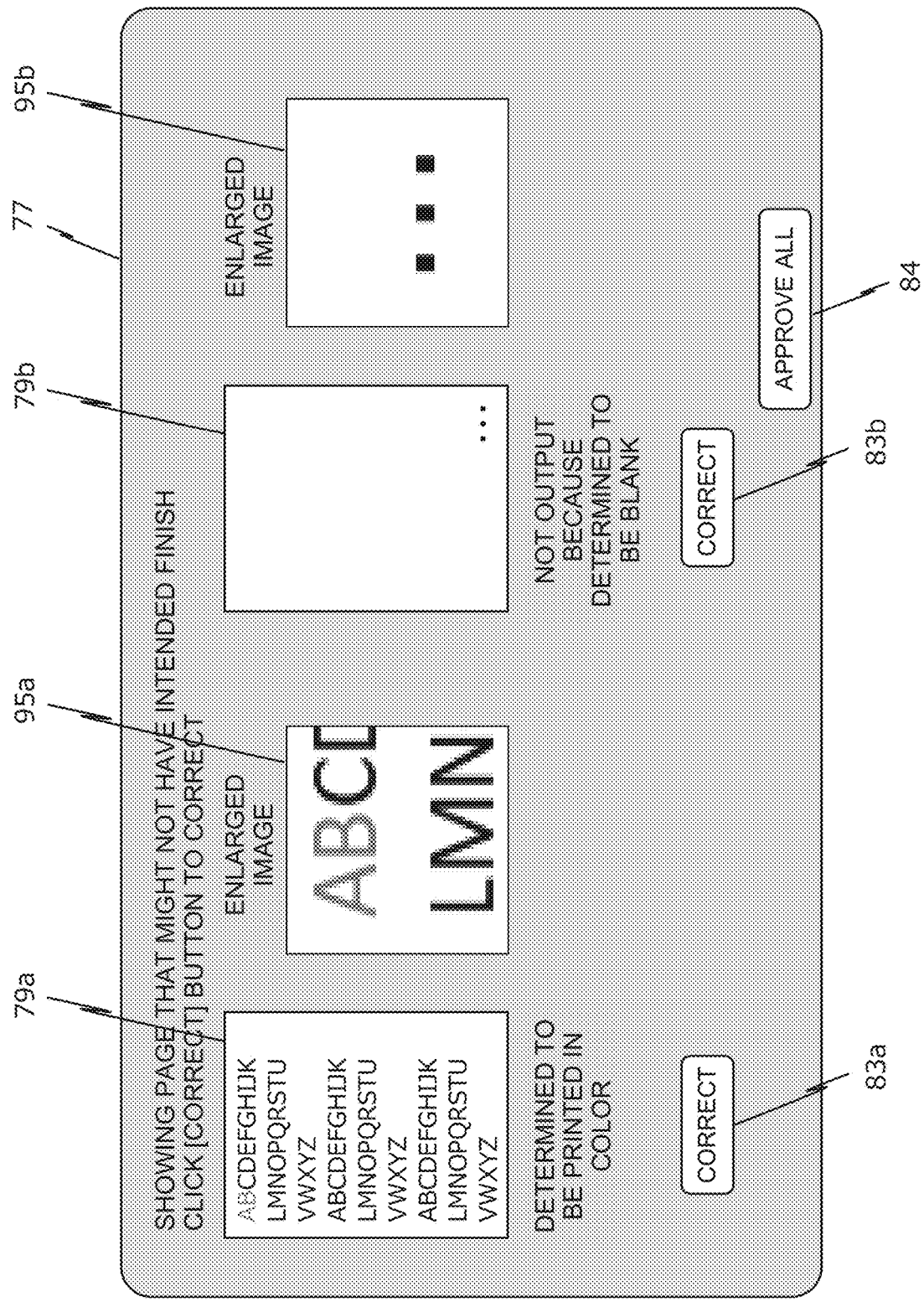

IMAGE READING APPARATUS AND IMAGE READING METHOD

CROSS-REFERENCE TO RELATED APPLICATION

The present application claims priority from Japanese Patent Application Number 2021-039377, the content to which is hereby incorporated by reference into this application.

BACKGROUND OF THE INVENTION

1. Field of the Invention

One aspect of the present invention relates to an image reading apparatus and an image reading method having a function for reading and previewing a document.

2. Description of the Related Art

An image reading apparatus is known that reads a multi-page document using a document feeder or the like, performs image processing, and then outputs or prints the document as data. For example, some office multifunction peripherals are capable of reading a single-sided A4-size document at a rate of 100 pages per minute (or 200 pages per minute for a double-sided document).

Many of such image reading apparatuses have a preview function that allows a user to check the finished state on an operation screen before the read document is output. However, when the number of document pages to be read is large, it is time consuming and cumbersome for the user to check, on the preview screen, one page at a time whether the color, size, etc. of the read document image is what the user wants. As a result, the user's attention tends to be distracted, and the risk of overlooking pages that need to be corrected increases, especially when there are many documents with similar images.

Accordingly, a function has been proposed for an image processing apparatus that discriminates the type of document image, such as text, photo, a combination of text and photo, for each page and performs image processing (for example, refer to Japanese Patent Publication No. 2010-258798).

SUMMARY OF THE INVENTION

The technique of Japanese Unexamined Patent Publication No. 2010-258798 is a function of previewing only the pages for which a specific determination result has been obtained. However, in the case of previewing for the purpose of correcting a page that has been erroneously determined, there is an aspect in which the page cannot be previewed without finding out to which determination result the page that has been erroneously determined belongs.

One aspect of the invention, which has been made in consideration of the above circumstances, provides an image reading apparatus and an image reading method capable of previewing by narrow down pages having a high possibility of erroneous determination in order to correct pages of a document that have been determined to have incorrect characteristics.

One aspect of the invention provides an image reading apparatus including a scanner unit that scans a document including a plurality of pages and reads an image of each of the pages; an image processing unit that determines characteristics of each page of the read images and performs image processing in accordance with the characteristics; a display device that previews the processed image of each page; an operation detection device that accepts a setting of an extraction condition related to the characteristics; and a controller that extracts, based on the set extraction condition, and previews a read image of a page having determination accuracy pertaining to the characteristics below a predetermined standard among the images processed for each page.

From a different point of view, one aspect of the invention provides a method of reading an image performed by a controller, the method including controlling a scanner unit to scan a document including a plurality of pages and reading an image of each of the pages; determining characteristics of each page of the read images and performing image processing in accordance with the characteristics; accepting a setting of an extraction condition related to the characteristics; and extracting, based on the set extraction condition, and previewing a read image of a page having determination accuracy pertaining to the characteristics below a predetermined standard among the images processed for each page.

The image reading apparatus according to one aspect of the invention includes a controller that extracts, based on the set extraction condition, and previews a read image of a page having determination accuracy pertaining to the characteristics below a predetermined standard among the images processed for each page. In order to correct the pages of a document that have been determined to have the erroneous characteristics, the preview can be narrowed down to the pages having the highest possibility of erroneous determination.

The method of processing an image according to one aspect of the invention also exerts similar operational effects.

BRIEF DESCRIPTION OF THE DRAWINGS

FIG. 3 is a block diagram illustrating the details of the image processing unit illustrated in FIG. 2.

FIG. 10 is a diagram illustrating an example operation on the preview display illustrated in FIG. 6 causing correction of page size determination.

FIG. 12B is a second diagram illustrating an example operation for causing a preview display of a page narrowed down by specifying items to be determined, to appear, according to the second embodiment.

FIG. 13 is a diagram illustrating an example of preview of an extracted page, according to the third embodiment.

DETAILED DESCRIPTION OF THE INVENTION

One aspect of the present invention will be described below in further detail with reference to the accompanying drawings. The following description is illustrative in all respects, and should not be construed to limit the present invention.

First Embodiment

Configuration of Image Reading Apparatus

First, an image reading apparatus according to the present embodiment is described.

Figure 1:
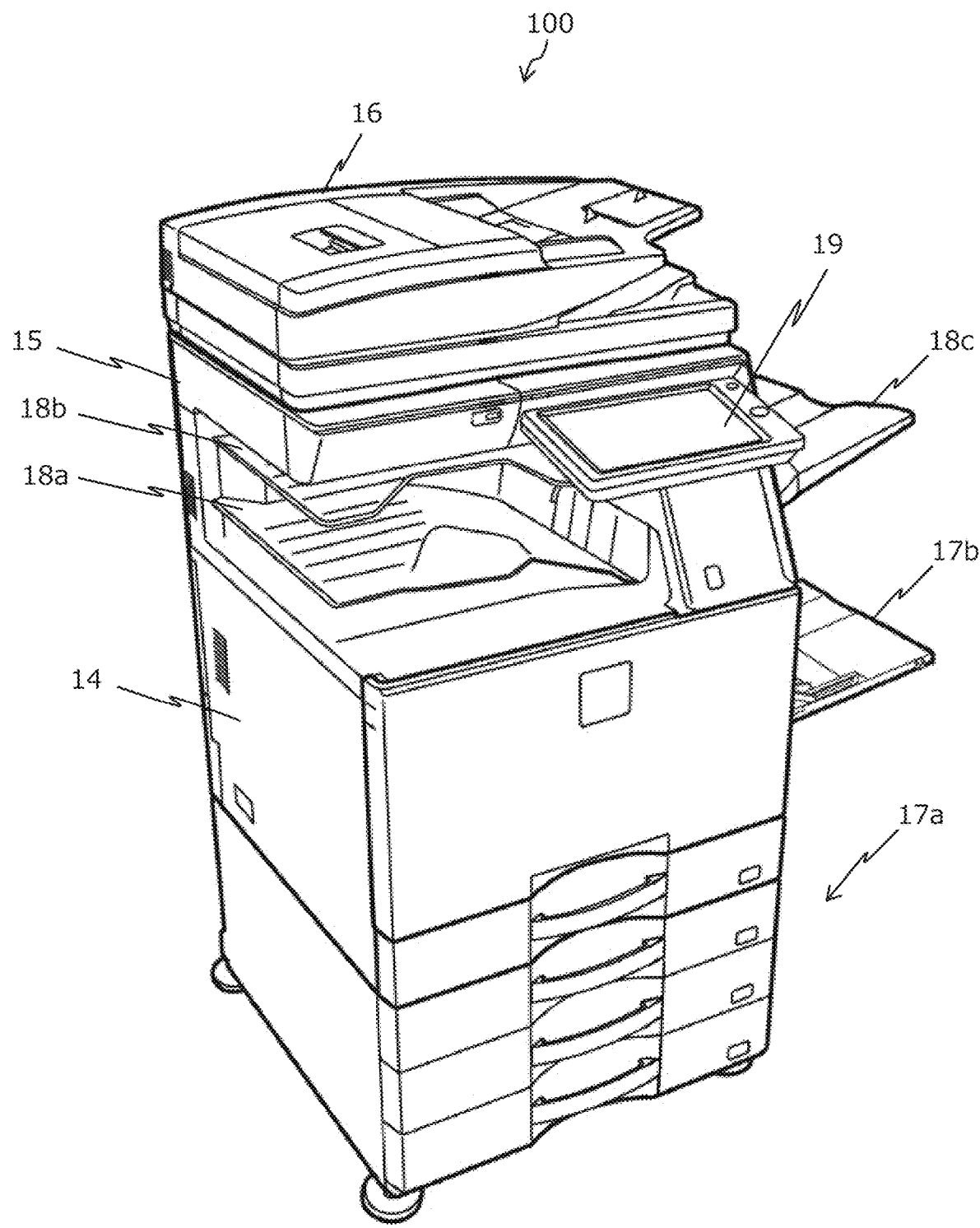
FIG. 1 is an external perspective view illustrating a multifunction peripheral as one aspect of an image reading apparatus according to an embodiment.
Figure 2:
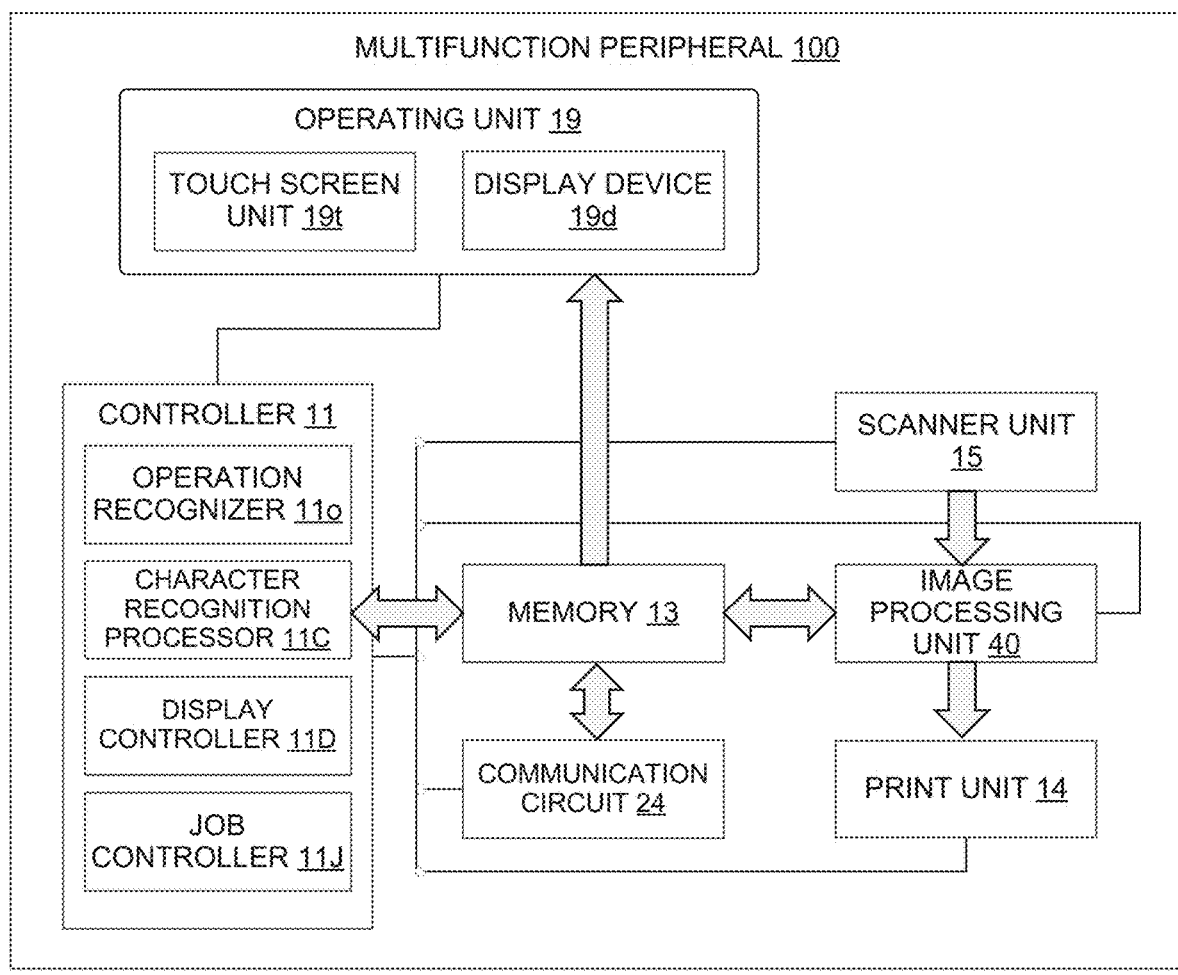
FIG. 2 is a block diagram illustrating an overall configuration of the multifunction peripheral illustrated in FIG. 1.

FIG. 1 is an external perspective view illustrating a multifunction peripheral as one aspect of an image reading apparatus according to an embodiment. FIG. 2 is a block diagram illustrating an overall configuration of the multifunction peripheral illustrated in FIG. 1.

As illustrated in the block diagram in FIG. 2, a multifunction peripheral 100 includes a controller 11, a memory 13 serving as a storage device, a print unit 14, a scanner unit 15, an operation unit 19 an image processing unit 40, and a communication circuit 24.

The operation unit 19 includes a touch screen unit 19t serving as an operation detection device and a display device 19d. The controller 11 includes an operation recognizer 11o, a display controller 11D, a job controller 11J, and a character recognition processor 11C.

As illustrated in FIG. 1, the operation unit 19 is disposed on the housing of the multifunction peripheral 100.

The touch screen unit 19t detects a user's operation on a display screen of the display device 19d. The operation recognizer 11o recognizes a signal of an operation detected by the touch screen unit 19t and recognizes which element on the display screen of the display device 19d has been operated.

The display device 19d includes, for example, a liquid crystal display device. The display device 19d displays a screen under the control of the display controller 11D.

The job controller 11J determines the content to be displayed on the display device 19d by the display controller 11D on the basis of the operation recognized by the operation recognizer 11o or the status of the multifunction peripheral 100 and updates the content.

The job controller 11J recognizes the status detected by sensors (not illustrated) provided in the scanner unit 15 and the print unit 14. The job controller 11J controls operations of motors, actuators, devices, etc. (not illustrated) provided in the scanner unit 15 and the print unit 14. The job controller 11J also controls image-related processing of the image processing unit 40 to read, print, and preview the image of a document.

The character recognition processor 11C performs character recognition and layout recognition processing on the images of the document stored in the memory 13.

The controller 11 is composed mainly of a central processing unit (CPU) or a micro processing unit (MPU). The CPU and MPU are collectively referred to as a processor in this specification. In addition to the processor, the controller 11 includes hardware resources such as a memory, an input/output interface circuit, or a timer circuit. The processor executes a control program stored in the memory so as to perform various jobs for the recognition of an operation, the control on display, the reading of an original image, the printing of an image, and the like, in other words, a series of processes for image formation.

The memory 13 includes a nonvolatile memory that stores the functional settings pertaining to program functions. Examples of the hardware included in the nonvolatile memory include a flash memory. The memory 13 may be included in the controller 11. That is, the memory 13 may be form an integrated unit with the memory of the controller. The processor executes processing in accordance with the control programs stored in the memory of the controller 11 or the memory 13 and controls the multifunction peripheral 100. That is, a function of the controller 11 is implemented by the cooperation of the software resources and the hardware resources.

The controller 11 is coupled to the print unit 14 and the scanner unit 15 so as to transfer data with each other.

The communication circuit 24 is a circuit for performing data communication with an external device via a network.

As illustrated in FIG. 1, the multifunction peripheral 100 includes a document feed unit 16. Although not illustrated in FIG. 1, a document glass is included, which is hidden by the document feed unit 16.

The scanner unit 15 reads the image of a document under the control of the job controller 11J and convert the read image into red, green, and blue (RGB) color image signals (RGB analog signals). That is, the scanner unit 15 performs the image reading processing for copy, fax, and scanner jobs.

The image processing unit 40 generates image data on the basis of the image signal output from the scanner unit 15. Alternatively, the image processing unit 40 generates the image data for printing based on the print data received via the communication circuit 24. The generated image data is then printed by the print unit 14 or sent to an external device via the communication circuit 24.

As illustrated in FIG. 1, the multifunction peripheral 100 includes paper trays 17a and 17b and output trays 18a, 18b, and 18c.

The paper tray 17a individually accommodates sheets of various sizes. The paper tray 17b is a bypass tray having the exposed part where paper is placed so that the user may easily replace the paper.

A paper feed mechanism (not illustrated in FIGS. 1 and 2) feeds a sheet set in the selected paper tray 17a or 17b to the print unit 14 under the control of the job controller 11J.

The print unit 14 prints the designated image data on the sheet fed from the paper tray 17a or 17b under the control of the job controller 11J. Examples of jobs for printing include print jobs as printers, copy jobs as copiers, or facsimile reception jobs for fax reception.

A paper output mechanism (not illustrated in FIGS. 1 and 2) outputs the sheet having undergone printing by the print unit 14 to any selected one of the output trays 18a, 18b, and 18c under the control of the job controller 11J.

Configuration of Image Processing Unit

The image processing unit 40, which performs image processing on the images of each page of a read document will now be described.

FIG. 3 is a block diagram illustrating the details of the image processing unit illustrated in FIG. 2.

In this embodiment, the image processing unit 40 is an integrated circuit that performs image processing on image data (image signals) and includes an application specific integrated circuit (ASIC). As illustrated in FIG. 3, the image processing unit 40 includes the following blocks: an analog-to-digital (AD) converter 42, a shading corrector 43, an input processor 44, a document type automatic determiner 45, an area separation processor 46, a compressor 47, and an area separation signal compressor 48. The image processing unit 40 further includes the following blocks: a decoder 49, an area separation signal decoder 50, an image quality adjuster 51, a color corrector 53, a black generator/undercolor remover 54, a spatial filter unit 55, a magnification varier 56, an output tone corrector 57, and a halftone generator 58. The processing performed by each block of the image processing unit 40 will now be described with reference to a reading operation of a copy job as an example. A copy job is a job in which a document is read and printed.

The AD converter 42 is a block that converts a color image signal (RGB analog signal) sent from the scanner unit 15 into digital image data (RGB digital signal). The shading corrector 43 is a block that performs processing on the image data sent from the AD converter 42 to remove various distortions caused by the illumination, optical system, and imaging circuit of the scanner unit 15. The input processor 44 is a block that performs tone conversion processing, such as gamma correction processing, on each piece of the RGB image data sent from the shading corrector 43.

The document type automatic determiner 45 determines the type of the document that has been read by the scanner unit 15 on the basis of the RGB image data (RGB density signal) subjected to processing such as gamma correction by the input processor 44. The types of documents to be determined include text documents, printed photo documents, and text-printed photo documents that are a combination of text and printed photos. The determination whether text document, printed photo document, text-printed photo document, etc. is performed by a document type determiner 45a of the document type automatic determiner 45. As illustrated in FIG. 3, the document type automatic determiner 45 includes, in addition to the document type determiner 45a, a color/monochrome determiner 45b and a blank document determiner 45c. The color/monochrome determiner 45b performs color/monochrome determination processing (auto color selection (ACS)) to determine whether or not the document is a color document or a monochrome document. The blank document determiner 45c performs process to determine whether or not the document is a blank document (a plain document). The RGB image data output from the document type automatic determiner 45 is input to the area separation processor 46 and the compressor 47. Moreover, a color/monochrome determination signal indicating a determination result by the color/monochrome determiner 45b, a document type determination signal indicating a determination result by the document type determiner 45a, and a blank document determination signal indicating a determination result by the blank document determiner 45c are input to the area separation processor 46 and the compressor 47.

On the basis of the RGB image data sent from the document type automatic determiner 45, the area separation processor 46 performs processing to determine the image area into which each pixel of the input image is classified and generate an area separation signal indicating the determination result. Here, the image areas determined by the area separation processor 46 include black text areas, color text areas, halftone areas.

The compressor 47 is a block for encoding the image data (RGB signals) sent from the document type automatic determiner 45. Note that the encoding is performed on the basis of, for example, a joint photographic experts group (JPEG) system.

The area separation signal compressor 48 is a block that performs compression processing on the area separation signal generated for each pixel. Note that the compression processing by the area separation signal compressor 48 is performed on the basis of, for example, the modified modified read (MMR) method, which is a lossless compression method, and the modified read (MR) method.

The controller 11 associates the encoding code (encoded image data) output from the compressor 47 with the area separation signal code (compressed area separation signal) output from the area separation signal compressor 48. Furthermore, the controller 11 associates the codes with the document type data generated on the basis of the color/monochrome determination signal and the blank document determination signal, temporarily stores this in the memory 13, and managed this as filing data. The document type data in the present embodiment is generated on the basis of the color/monochrome determination signal and the blank document determination signal, but the document type data may alternatively be generated on the basis of at least one of the color/monochrome determination signal, the blank document determination signal, and the document type determination signal. When a copy output operation is instructed, the controller 11 reads the encoding code and the area separation signal code corresponding to the encoded code from the memory 13 and delivers them to the decoder 49 and the area separation signal decoder 50, respectively. Note that when the document type data represents a blank document, the reading is not performed. That is, the document is not printed or output.

Note that the controller 11 correlates the storage address or data name of the encoding code with the storage address of the area separation signal code and writes them in a management table. In other words, the controller 11 controls the reading or writing of the encoding code and the area separation signal code by using the management table.

The decoder 49 performs decoding processing on the encoding code to decompress the encoding code into RGB image data. the area separation signal decoder 50 performs decoding processing on the area separation signal code. The decoded area separation signal is delivered to the black generator/undercolor remover 54, the spatial filter unit 55, and the halftone generator 58. In the black generator/undercolor remover 54, the spatial filter unit 55, and the halftone generator 58, the image processing content is switched in accordance with the type of the image area.

The image quality adjuster 51 detects a base and performs base removal correction on the RGB image data sent from the decoder 49. Moreover, the image quality adjuster 51 adjusts the RGB balance (color adjustment, overall color adjustment of red and blue), brightness, and vividness on the basis of the setting information input by the user from the touch screen unit 19t of the operation unit 19.

Moreover, the image quality adjuster 51 performs processing for converting RGB image data into K (black) monochrome image data when the monochrome mode is selected or when the document is determined to be a monochrome document in the automatic determination mode.

In other words, as illustrated in FIG. 3, the output from the image quality adjuster 51 is RGB image data in full-color mode or in the automatic determination mode in which the image is determined to be a color document. When the monochrome mode is selected or when it is determined that the document is a monochrome document in the automatic determination mode, the output from the image quality adjuster 51 is K image data instead of RGB image data.

The color corrector 53 is a block that performs processing for converting RGB image data into CMY (cyan, magenta, yellow) image data and enhancing color reproducibility of the image data on a document that is determined to be a full-color document in a full-color mode or an automatic determination mode. Note that the color correction processing is performed by creating a lookup table (LUT) in which input values (RGB) are correlated with output values (CMY) and looking up the output value in the created LUT.

If the document is determined to be a monochrome document in a monochrome mode or the automatic determination mode, the color corrector 53 does not perform any processing on the K image data and delivers (passes through) the image data directly to the black generator/undercolor remover 54.

When the document is determined to be a color document in the full-color mode or the automatic determination mode, the black generator/undercolor remover 54 performs black generation to generate black (K) image data from the CMY image data output from the color corrector 53. The black generator/undercolor remover 54 also performs processing for generating new CMY image data by subtracting black (K) image data from the original CMY image data. As a result, when the document is determined to be a color document in full-color mode or the automatic determination mode, the CMY image data is converted into the image data of the four colors of CMYK by the black generator/undercolor remover 54, as illustrated in FIG. 3.

If the document is determined to be a monochrome document in the monochrome mode or the automatic determination mode, the black generator/undercolor remover 54 does not perform any processing on the K image data output from the color corrector 53 and delivers (passes through) the image data directly to the subsequent spatial filter unit 55.

Note that when the full-color mode is selected or when the document is determined to be a full-color document in the automatic determination mode, the output of the black generator/undercolor remover 54 and the input/output of each block subsequent to the black generator/undercolor remover 54 are CMYK image data, as illustrated in FIG. 3. However, when the document is determined to be a monochrome document in the monochrome mode or the automatic determination mode, the output of the black generator/undercolor remover 54 and the input/output of each block subsequent to the black generator/undercolor remover 54 are K image data, unlike that illustrated in FIG. 3.

The spatial filter unit 55 performs spatial filter processing (enhancement processing, smoothing processing, etc.) on the CMYK or K image data output from the black generator/undercolor remover 54 by using a digital filter based on the area separation signal (area identification signal). In other words, the spatial filter unit 55 executes image processing different for each image area on the basis of the area separation signal.

The magnification varier 56 is a block that performs magnification or reduction processing of an image on the basis of a magnification varying operation (information indicating the magnification of a printed image) input by a user via the operation unit 19.

The output tone corrector 57 is a block that performs output gamma correction processing for outputting image data output from the magnification varier 56 to a recording medium such as a sheet of paper. The halftone generator 58 executes tone reproduction processing (halftone generation processing) necessary for printing an image in the print unit 14 by using an error diffusion method or a dither method.

The CMYK or K image data output from the halftone generator 58 is delivered to the print unit 14, and the print unit 14 prints the image of the image data on the sheet.

The image processing in the copy mode for printing a read document has been described above.

When, for example, an image to be printed is previewed in a copy job, the image processing unit 40 performs image processing for outputting the image read by the scanner unit 15 to the display device 19d of the operation unit 19.

The content of the processing in each block is generally the same as that of the copier job, but the color corrector 53 performs the processing for converting the input RGB image data into R'G'B' image data that matches the color space of the display device 19d.

In the subsequent blocks, the processing of the R'G'B' image data is performed in accordance with the characteristics (resolution, tone characteristics, etc.) of the display device 19d, instead of the CMYK image data illustrated in FIG. 3. Note that the halftone generator 58 outputs (passes through) the image data without performing any processing. In the preview display in the present embodiment, tone reproduction processing using an error diffusion method or a dither method is not performed.

When character recognition processing is performed, the image data output from the image processing unit 40 is stored in the memory 13, and the character recognition processor 11C performs processing for recognizing layout and characters on each page of the stored image data. The up-down orientation of the page is determined on the basis of the up-down orientation of the recognized characters. The tilt of the image may be determined on the basis of the sequence of the recognized characters.

Figure 4A:
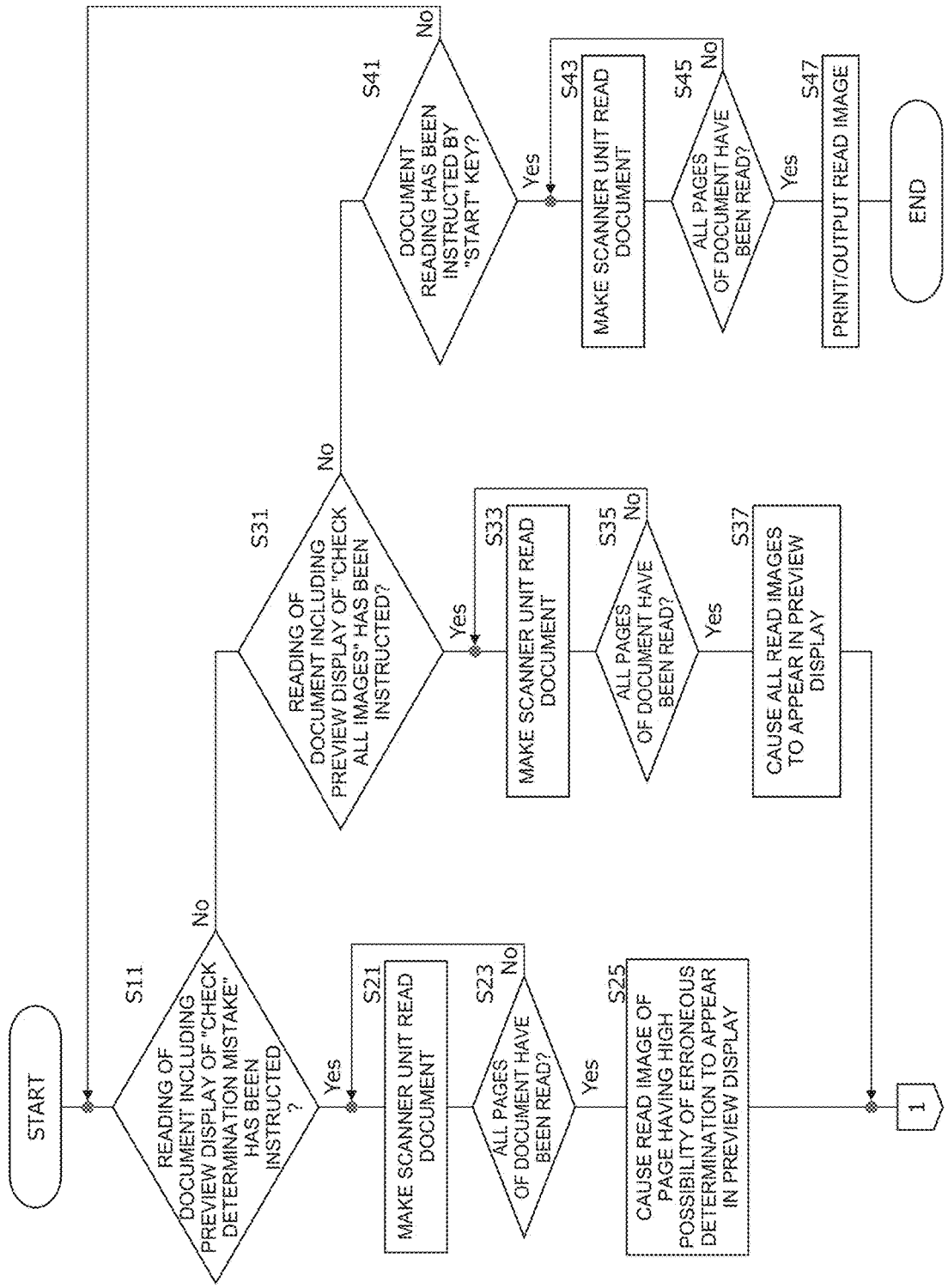
FIG. 4A is a first flowchart illustrating the flow of image reading processing according to a first embodiment.
Figure 4B:
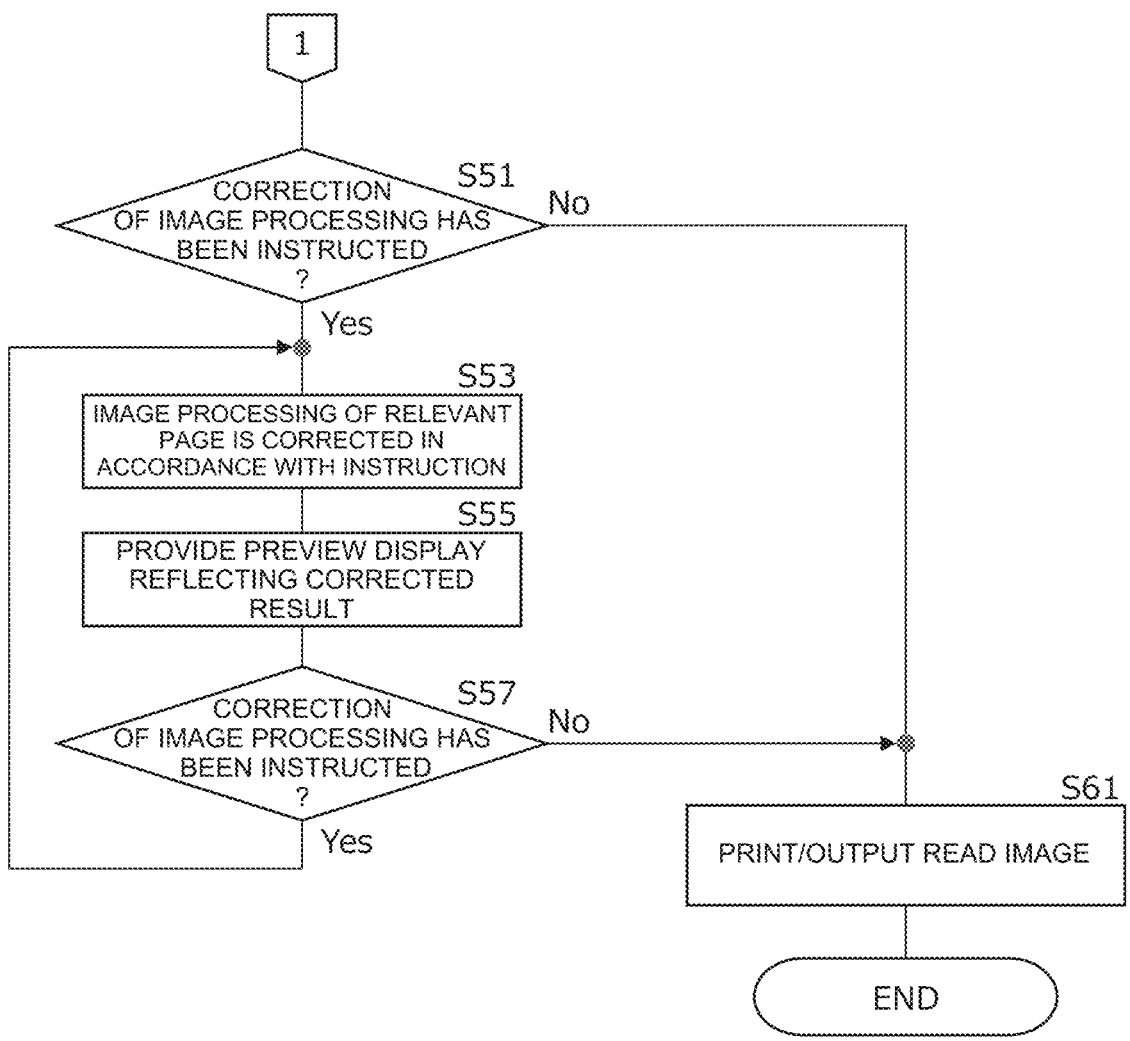
FIG. 4B is a second flowchart illustrating the flow of image reading processing according to a first embodiment.

Processing of Preview Display of Extracted Page and Erroneous Determination Correction FIGS. 4A and 4B are flowcharts illustrating the flow of the image reading processing executed by the controller 11 serving as the job controller 11J in the present embodiment. FIGS. 5 to 10 are diagrams illustrating an example operation to the operation unit 19.

The overall flow of the image reading processing according to the present embodiment will now be explained with reference to FIGS. 4A and 4B.

Figure 5:
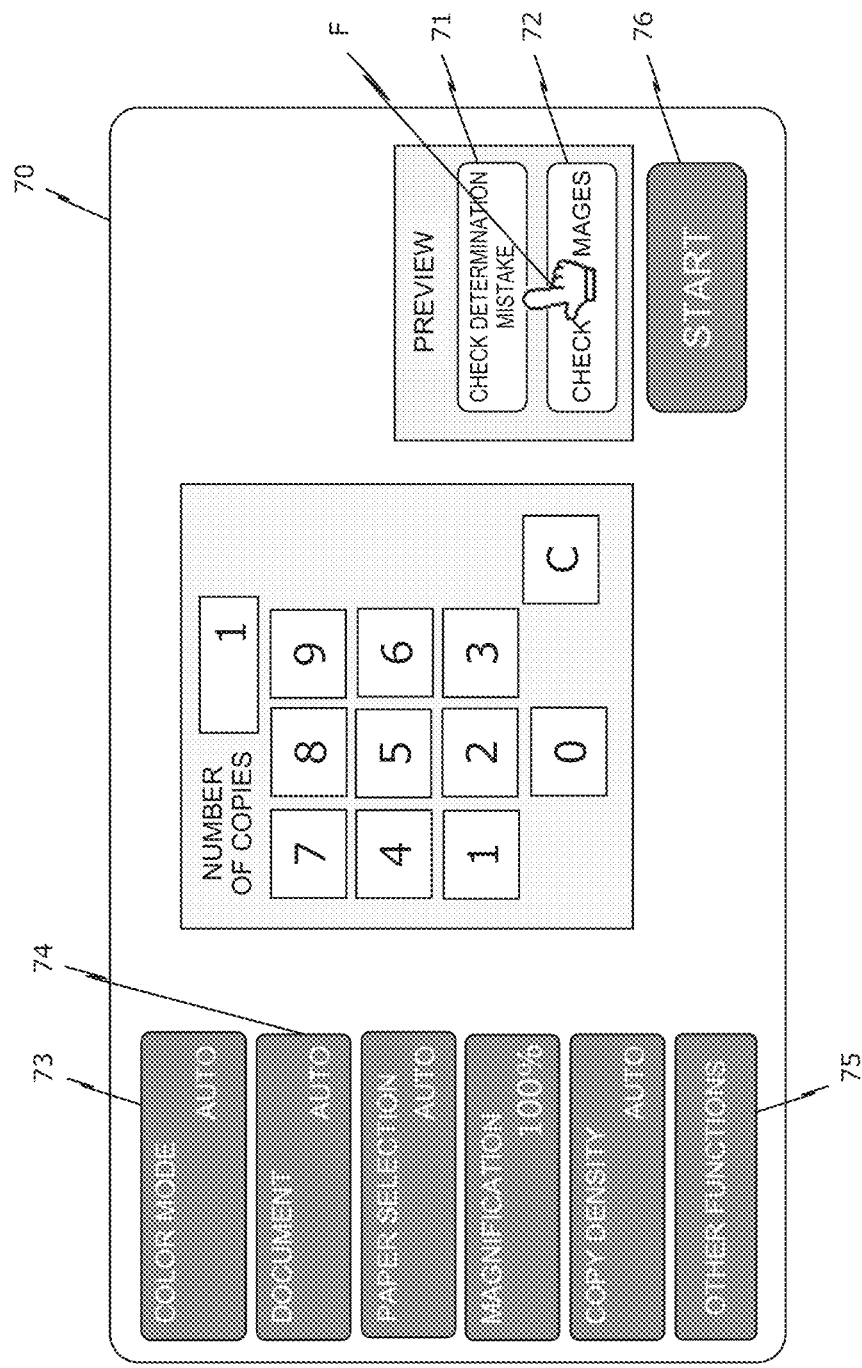
FIG. 5 is a diagram illustrating an example operation for causing a preview display according to the first embodiment.

The controller 11 serving as the operation recognizer 11o accepts the setting of a job that involves the reading of a document on a basic copy screen 70 illustrated in FIG. 5. The controller 11 then checks whether or not a [determination error check] key 71 has been touched (see step S11 in FIG. 4A).

When the job is set and the [determination error check] key 71 is touched by the user's finger F (Yes in step S11), the controller 11 serving as the job controller 11J causes the scanner unit 15 to read the documents one page at a time. The controller 11 causes the image processing unit 40 to perform image processing corresponding to the job set for the image of each page (step S21). When all the pages have been read (Yes in step S23), a read image of a page having a high possibility of erroneous determination involving the image processing among the pages of each read document is previewed on the display device 19*d* (step S25). The screen of the displayed preview and the processing after the preview display will be described later.

When it is determined in step S11 that the [determination error check] key 71 has no touched, the controller 11 serving as the operation recognizer 11*o* determines whether or not an [all image check] key 72 on the basic copy screen 70 has been touched (step S31). When the [all image check] key 72 has been touched (Yes in step S31), the controller 11 serving as the job controller 11J causes the scanner unit 15 to read the document one page at a time and causes the image processing unit 40 to perform image processing corresponding to the job set for the image of each page (step S33). When all the pages have been read (Yes in step S35), the page of each read document is previewed on the display device 19*d* (step S37). The subsequent processing will be described later.

Note that, in the example of the operation screen illustrated in FIG. 5, two options pertaining to the preview are presented: the [determination error check] key 71 and the [all image check] key 72. That is, the user is provided with an option of previewing only pages with the possibility of erroneous determination or all pages. As another aspect, a [preview] key may be presented in place of the two operation keys, the [determination error check] key 71 and the [all image check] key 72, illustrated in FIG. 5. In such a case, the controller 11 may display pages having a possibility of erroneous determination at the top of the list display in the preview illustrated in FIG. 6, and subsequently display preview images of all pages or the remaining pages in page order.

Alternatively, an option relating to the preview may be presented in the same manner as in FIG. 5, and when the [determination error check] key 71 is touched, pages having a possibility of erroneous determination may be displayed at the top of the list display, and subsequently display preview images of all pages or the remaining pages in page order. When the [all image check] key 72 is touched, preview images of all pages are displayed in page order.

When it is determined in step S31 that the [all image check] key 72 has no touched, the controller 11 serving as the operation recognizer 11*o* determines whether or not a [start] key 76 on the basic copy screen 70 has been touched (step S41). When the [start] key 76 has been touched, the controller serving as the job controller 11J causes the scanner unit 15 to read the document one page at a time and causes the image processing unit 40 to perform image processing corresponding to the job set for the image of each page (step S43).

When all the pages have been read (Yes in step S45), the controller 11 serving as the job controller 11J prints or outputs the image of each read document in accordance with the set job type. That is, in the case of a copy job, the print unit 14 is instructed to perform printing. In the case of a scan job, data of an image read to a set transmission destination or storage destination is sent to an external device via the communication circuit 24. Note that depending on the job setting, the image data may be stored in the memory 13. The processing then ends.

Post-preview processing will now be described.

When the read image is previewed on the display device 19*d* in step S25 or step S37, the controller 11 serving as the job controller 11J monitors whether or not a correction instruction is given to the preview image of any page (step S51 in FIG. 4B).

If the controller 11 serving as a job controller 11J determines that no correction instruction has been given for any preview image (No in step S51), the controller 11 prints or outputs the image of each read document that in accordance with the set job type (Step S61). The processing then ends.

When the controller 11 serving as a job controller 11J accepts a correction instruction for any displayed preview image (Yes in step S51), the controller 11 corrects the image processing of the corresponding page in accordance with the correction instructions (step S53). The image of the corrected page is then previewed (step S55).

When the corrected image is previewed on the display device 19*d*, the controller 11 serving as the job controller 11J monitors whether or not a correction instruction is given to the preview image of any page (step S57).

When the controller 11 serving as a job controller 11J determines that no correction instruction has been given for any preview image (No in step S57), the controller 11 prints or outputs the image of each read document that in accordance with the set job type (Step S61). The processing then ends.

When the controller 11 serving as the job controller 11J accepts a correction instruction for any of the displayed preview images (Yes in step S57), the controller 11 returns the processing to step S53, corrects the image processing of the corresponding page, and previews the corrected image (step S55).

This is the overall flow of the processing for reading and previewing images.

Specific examples of operations will now be explained with reference to FIGS. 5 to 10.

FIG. 5 is a diagram illustrating the basic copy screen 70, which accepts settings and job starts pertaining to copy jobs. When the operation of the [determination error check] key 71 illustrated in FIG. 5 is accepted, the controller 11 reads all pages of the document and applies the image processing that has been set. While the document is being read, the [determination error check] key 71 is highlighted to indicate that the page with the highest possibility of erroneous determination is to be previewed. After all pages have been read, the images of the pages whose accuracy of determination for image processing does not meet the predetermined standard appear on the display device 19*d*. In other words, preview images are displayed for the pages that have a high possibility of erroneous determination.

For example, in the case of color/monochrome determination for determining whether or not the image on each page is color or monochrome, the difference in the number of R, G, and B pixels is calculated as the feature value for all the pixels read on that page. The difference in the number of R, G, and B pixels obtained as the feature value is then compared with a predetermined threshold to determine whether or not the target page is color or monochrome. The job controller 11J extracts the pages of which the distance between the obtained features and the threshold value (or the difference if the feature values are scalars) does not meet the predetermined standard (the feature values are approximate the threshold value) and previews these pages.

An example feature value pertaining to the blank determination is the percentage of blank pixels among the respective pixels with the undercolor removed. An example of a feature value pertaining to the up/down determination is the percentage of characters facing the same direction among the directions of the respective recognized characters. An example of a feature value pertaining to size determination is the detected length of the document in the feed direction.

The detected value of the document width may be added to this to serve as the feature value.

Figure 6:
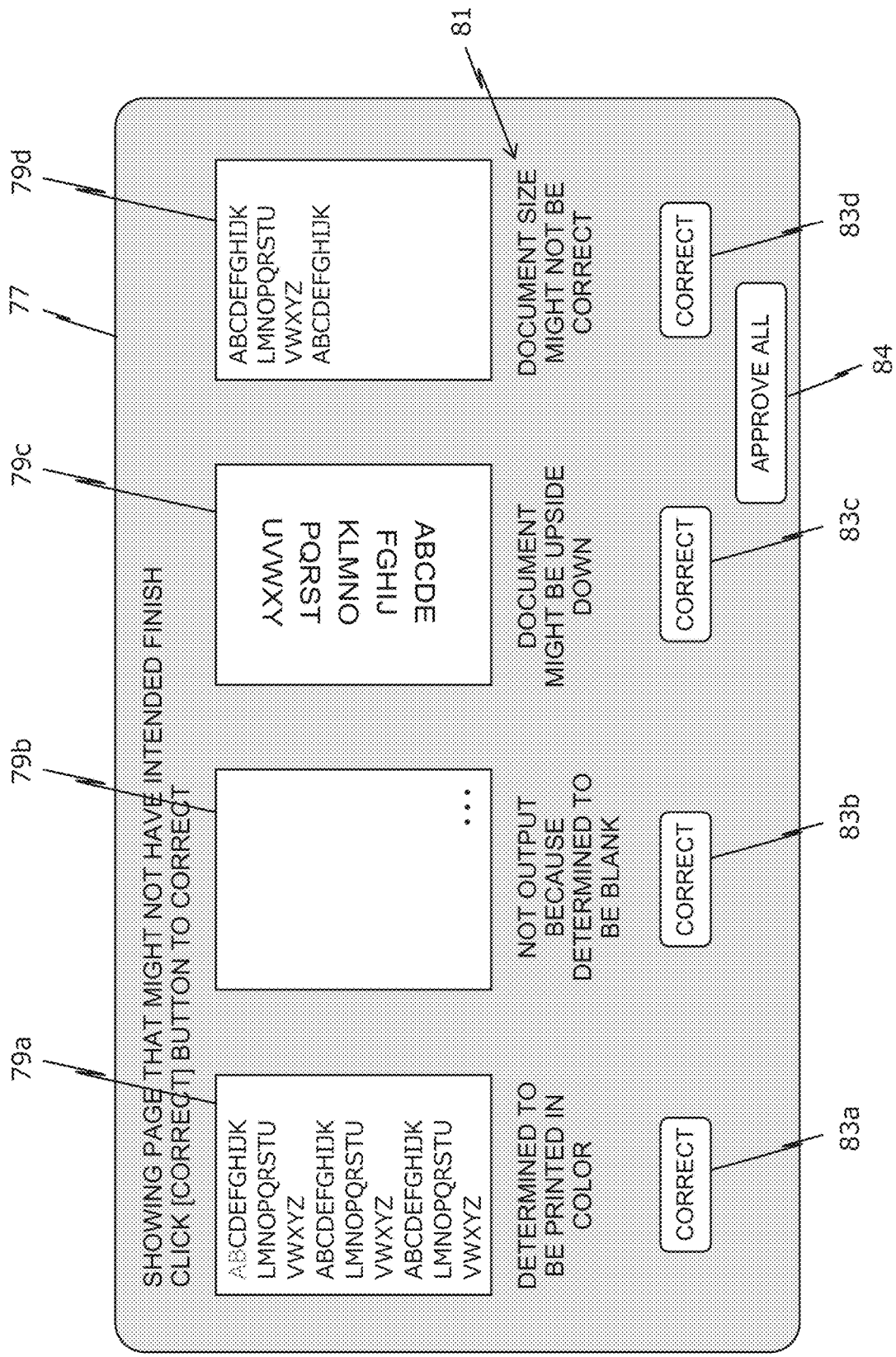
FIG. 6 is a diagram illustrating an example in which the page extracted as a result of the operation illustrated in FIG. 5 appears as a preview display.

FIG. 6 illustrates an example of a preview screen 77 that the job controller 11J causes to display on the display device 19d.

FIG. 6 illustrates an example where four page preview images 79a, 79b, 79c and 79d are displayed. The preview image 79a is extracted due to the low accuracy of the color/monochrome determination. The preview image 79b is extracted due to the low accuracy of the blank determination. The preview image 79c is extracted due to the low accuracy of the up/down determination. The preview image 79d is extracted due to the low accuracy of the size determination of a document. Here, the determination pertaining to the preview images 79a, 79b, 79c and 79d are all set for the copy job of the documents that have been read.

That is, the color/monochrome determination is executed by the color/monochrome determiner 45b of the image processing unit 40 when "auto" is set with a [color mode] key 73. The size determination of the document is executed by the job controller 11J on the basis of detection by a document size sensor (not illustrated) of the scanner unit 15 when "auto" is set with a [document] key 74. The blank determination and the up/down determination are both executed by the job controller 11J when settings of these are accepted on a function setting screen (not illustrated) displayed by the display controller 11D in response to a touch to an [other functions] key 75.

The controller 11 causes corresponding preview comments 81 to appear below the respective preview image 79a, 79b, 79c, and 79d, and corresponding [correct] keys 83a, 83b, 83c, and 83d to appear below the respective preview comments 81.

When any one of the [correct] keys 83a, 83b, 83c, and 83d is touched by the user's finger F, the controller 11 accepts correction of the determination processing pertaining to the corresponding preview image.

Figure 7:
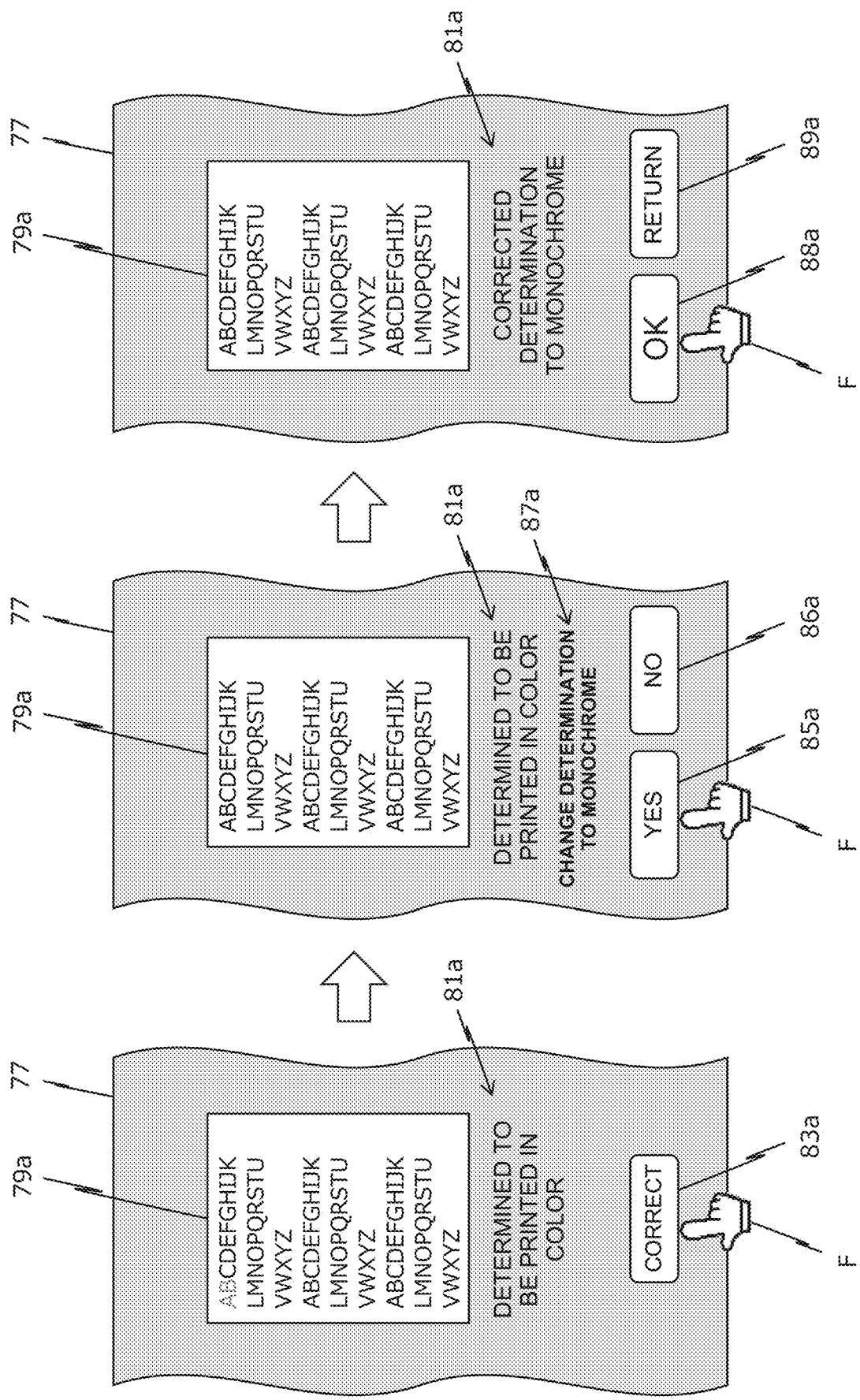
FIG. 7 is a diagram illustrating an example operation on the preview display illustrated in FIG. 6 causing correction of color/monochrome determination.
Figure 8:
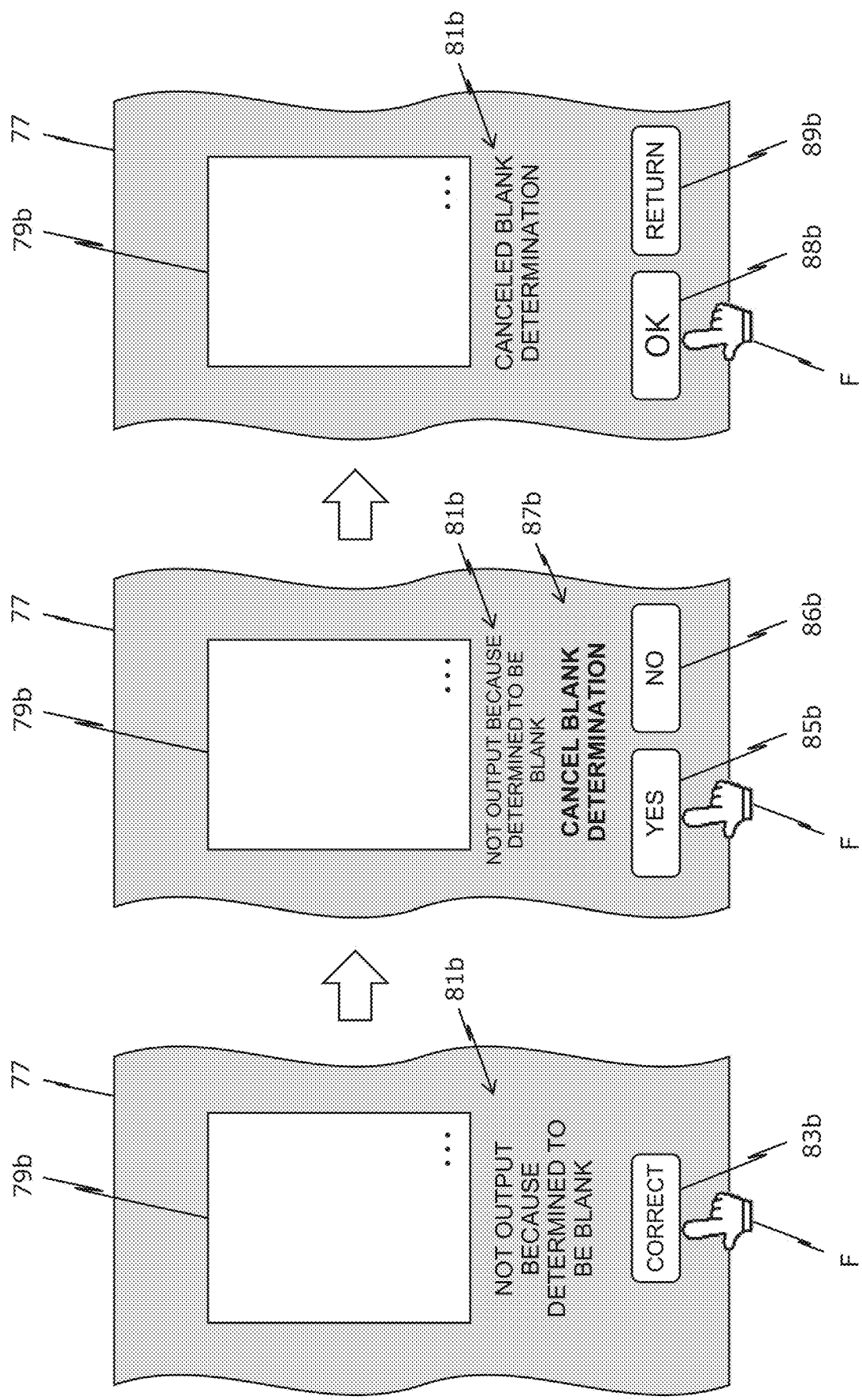
FIG. 8 is a diagram illustrating an example operation on the preview display illustrated in FIG. 6 causing correction of blank determination.

For example, when the [correct] key 83a is touched, the job controller 11J accepts the correction of the color/monochrome determination of page pertaining to the corresponding preview image 79a. Specifically, as illustrated in FIG. 7, a correction message 87a, a [yes] key 85a, and a [no] key 86a appear in response to the operation of the [correct] key 83a.

When the [no] key 86a is touched, the display is returned to the original screen illustrated in FIG. 6, and when the [yes] key 85a is touched, the determination is corrected in response. In the example illustrated in FIG. 7, the color determination, which is the original determination result, is corrected to a monochrome determination. The preview image 79a is then updated to the corrected image, and the preview comment 81a is displayed to indicate that the correction has been made. An [OK] key 88a and a [return] key 89a then appear.

When the [return] key 89a is touched, the page is restored to the image before correction. That is, the display is returned to the display illustrated in FIG. 6 (the same as the display illustrated at the left end of FIG. 7). When the [OK] key 88a is touched, the corrected image is adopted. In the screen display, the preview image 79a and preview comment 81a are replaced with the corrected version in the screen illustrated in FIG. 6.

When the [correct] key 83b is touched, the job controller 11J accepts the correction of the blank determination of page pertaining to the corresponding preview image 79b. Specifically, as illustrated in FIG. 7, a correction message 87b, a [yes] key 85b, and a [no] key 86b appear in response to the operation of the [correct] key 83b.

When the [no] key 86b is touched, the display is returned to the original screen illustrated in FIG. 6, and when the [yes] key 85b is touched, the determination is corrected in response. In the example illustrated in FIG. 8, the blank page, which is the original determination result, is corrected to a non-blank page. Then, the fact that the correction has been made is displayed as the preview comment 81b. An [OK] key 88b and a [return] key 89b then appear.

When a [return] key 89b is touched, the page is restored to the image before correction. That is, the display is returned to the display illustrated in FIG. 6 (the same as the display illustrated at the left end of FIG. 8). When the [OK] key 88b is touched, the corrected image is adopted. In the screen display, the preview comment 81b is replaced with the corrected version in the screen illustrated in FIG. 6.

Figure 9:
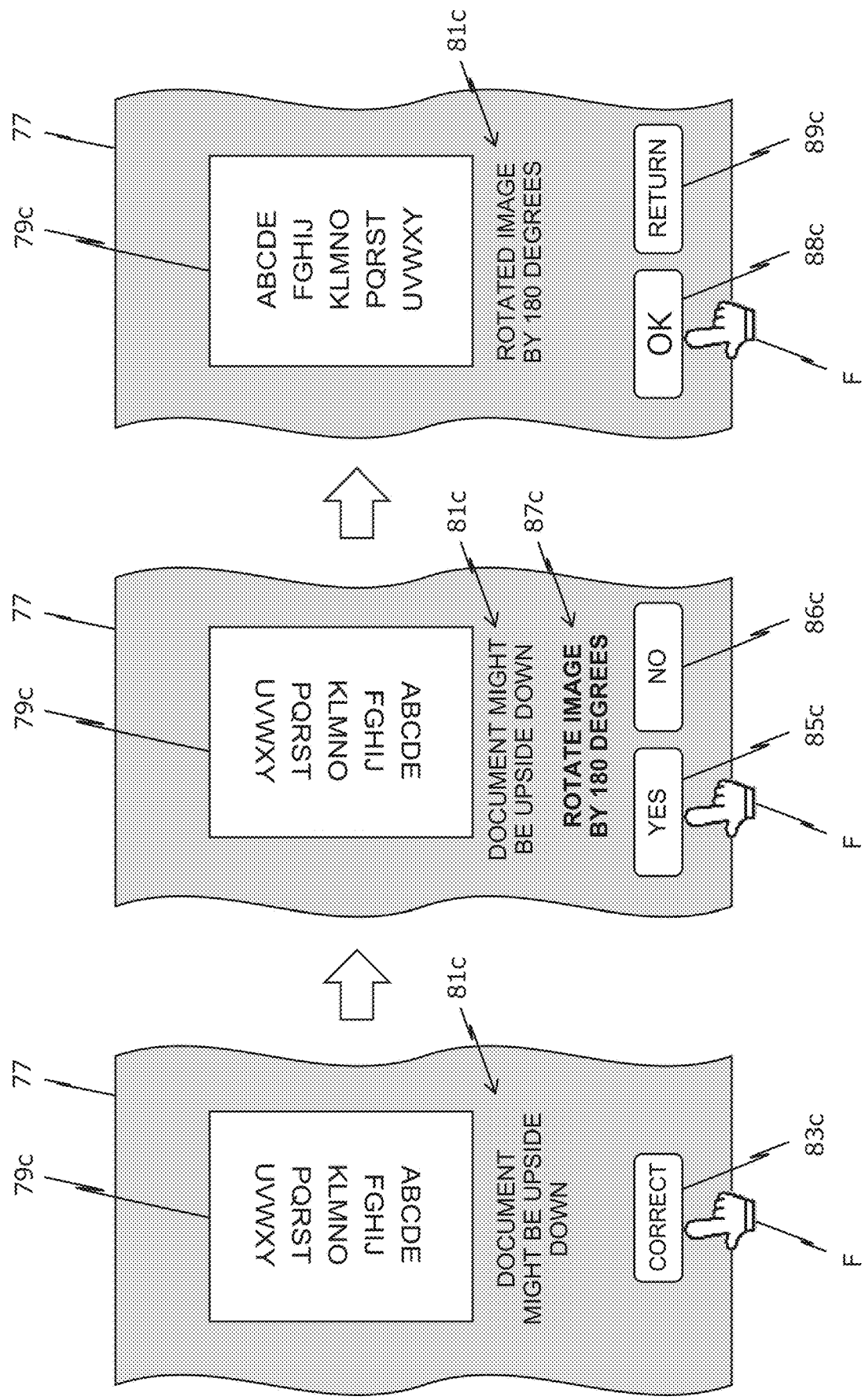
FIG. 9 is a diagram illustrating an example operation on the preview display illustrated in FIG. 6 causing correction of up/down determination.

When the [correct] key 83c is touched, the job controller 11J accepts the correction of the up/down determination of page pertaining to the corresponding preview image 79c. Specifically, as illustrated in FIG. 9, a correction message 87c, a [yes] key 85c, and a [no] key 86c appear in response to the operation of the [correct] key 83c.

When the [no] key 86c is touched, the display is returned to the original screen illustrated in FIG. 6, and when the [yes] key 85c is touched, the determination is corrected in response. In the example illustrated in FIG. 9, the original determination result is corrected by turning the image upside-down. The preview image 79c is then updated to the corrected image, and the preview comment 81c is displayed to indicate that the correction has been made. An [OK] key 88c and a [return] key 89c then appear.

When a [return] key 89c is touched, the page is restored to the image before correction. That is, the display is returned to the display illustrated in FIG. 6 (the same as the display illustrated at the left end of FIG. 9). When the [OK] key 88c is touched, the corrected image is adopted. In the screen display, the preview image 79c and preview comment 81c are replaced with the corrected version in the screen illustrated in FIG. 6.

When the [correct] key 83d is touched, the job controller 11J accepts the correction of the size determination of page pertaining to the corresponding preview image 79d. Specifically, as illustrated in FIG. 10, a correction message 87d and a drop-down list 90d appear in response to the operation of the [correct] key 83d.

If a different size from the determination is selected in the drop-down list 90d, the determination is corrected in response. In the example illustrated in FIG. 9, the original determination result is corrected to a different size. The preview image 79d is then updated to the corrected image, and the preview comment 81d is displayed to indicate that the correction has been made. An [OK] key 88d and a [return] key 89d then appear.

When a [return] key 89d is touched, the page is restored to the image before correction. That is, the display is returned to the display illustrated in FIG. 6 (the same as the display illustrated at the left end of FIG. 10). When the [OK] key 88d is touched, the corrected image is adopted. In the screen display, the preview image 79d and preview comment 81d are replaced with the corrected version in the screen illustrated in FIG. 6.

Note that FIG. 6 illustrates preview images for four types of determination, but the same processing can be used for other determination. For example, determination pertaining to skew correction, which detects and corrects the skew of the document image on the basis of the sequence of characters through character recognition, and determination pertaining to base removal. These are mere examples and do not limit other determinations pertaining to other image processing that are not described here.

When an [approve All] key 84 illustrated in FIG. 6 is touched, the job controller 11J prints or outputs the image of all pages with the previewed contents, that is, the corrected pages reflect the correction.

Second Embodiment

In the first embodiment, pages having a high possibility of erroneous determination are previewed for all determinations pertaining to job settings. However, alternatively, the user may select items pertaining to determination and preview pages with a high possibility of erroneous determination by focusing on the selected items.

Figure 11A:
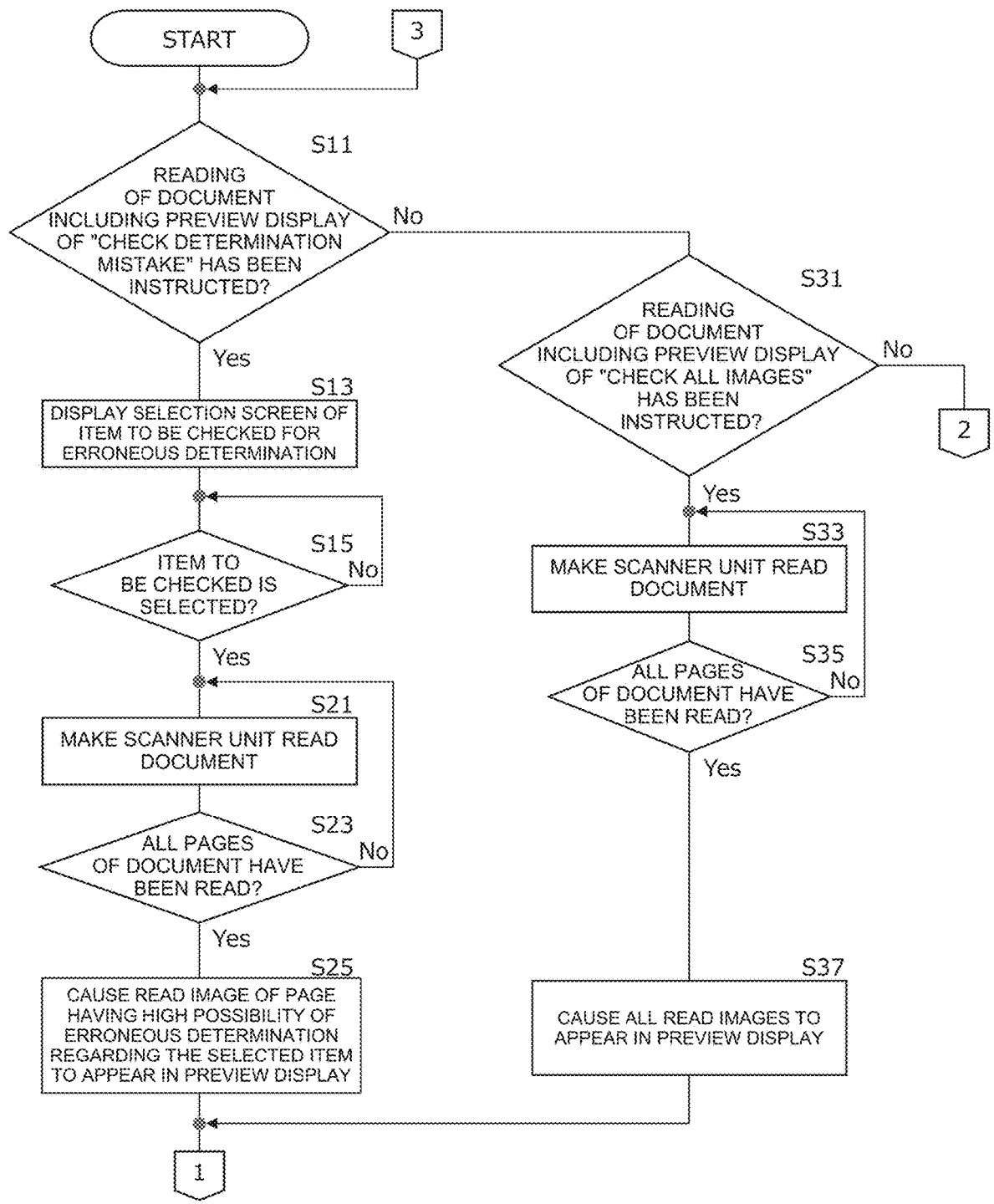
FIG. 11A is a first flowchart illustrating the flow of image reading processing according to a second embodiment.
Figure 11B:
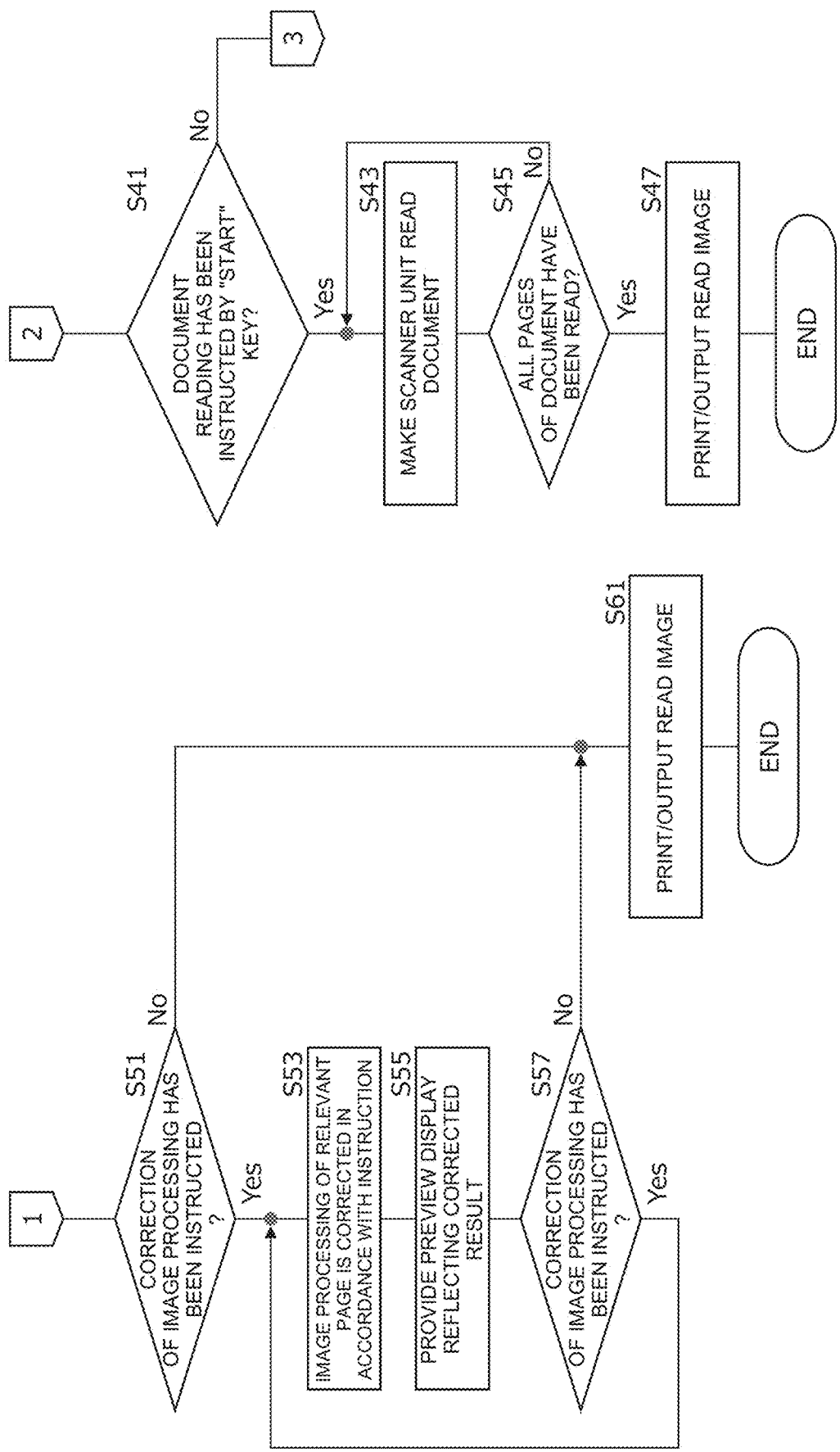
FIG. 11B is a second flowchart illustrating the flow of image reading processing according to the second embodiment.

FIGS. 11A and 11B are flowcharts illustrating the flow of image reading processing according to the present embodiment. Processing corresponding to those in FIGS. 4A and 4B are denoted by the same reference signs.

The steps in the processing illustrated in FIG. 11A that are not in FIG. 4A are steps S13 and S15. That is, when the [determination error check] key 71 is touched (Yes in step S11), the controller serving as the job controller 11J accepts the user's selection of the item pertaining to the determination (step S13). After the selection (Yes in step S15), similar to FIG. 4a, the controller 11 serving as the job controller 11J causes the scanner unit 15 to read the document one page at a time and causes the image processing unit 40 to perform image processing corresponding to the job set for the image of each page (step S21). The other steps of the processing are the same as those in FIGS. 4A and 4B, but as a result of the item selection in step S13, the preview display in step S25 is limited to the pages having a high possibility of erroneous determination of the selected items.

Figure 12A:
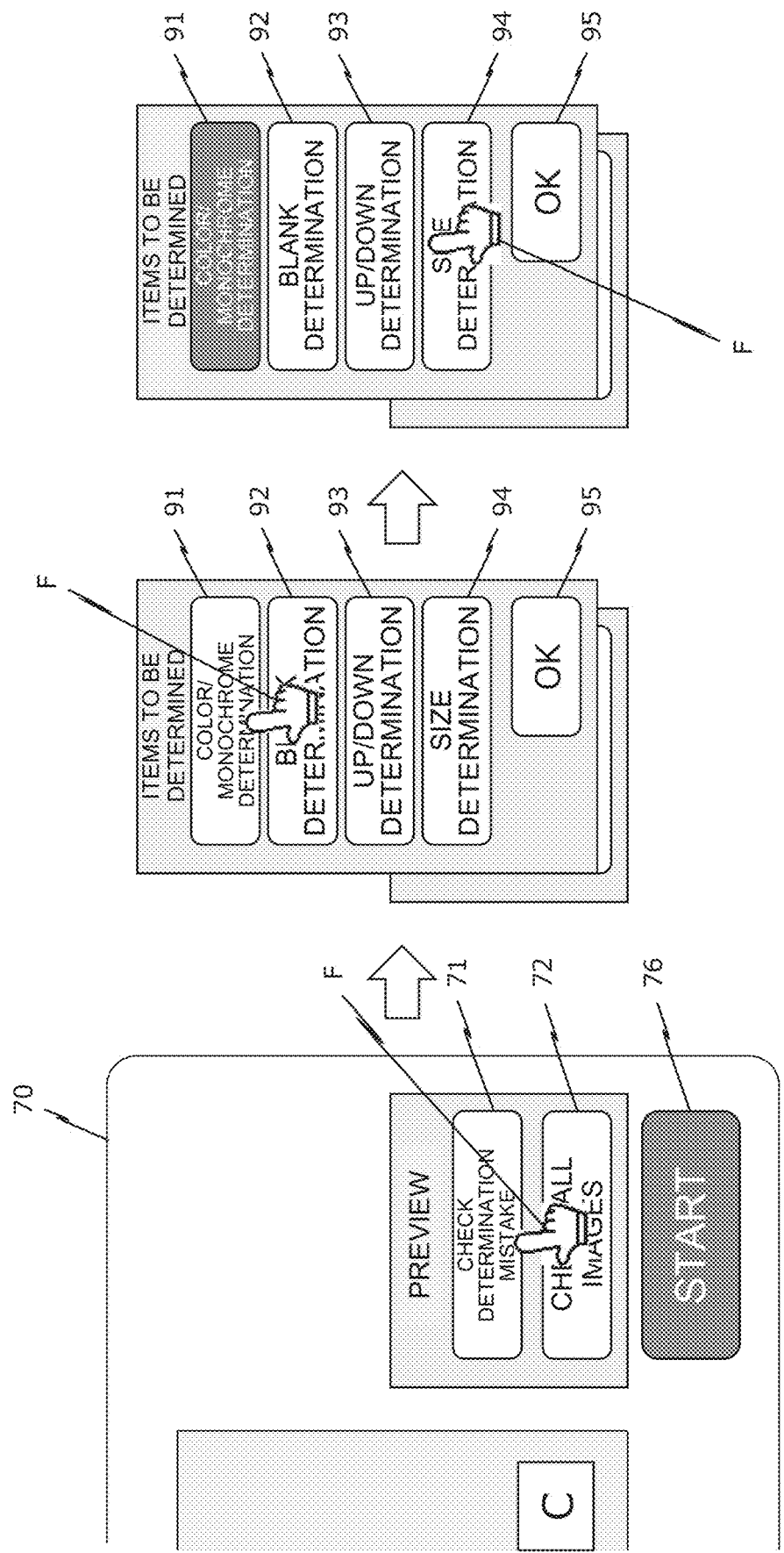
FIG. 12A is a first diagram illustrating an example operation for causing a preview display of a page narrowed down by designating items to be determined, to appear, according to the second embodiment.

FIGS. 12A and 12B are diagrams illustrating examples of operations corresponding to steps S13 and S15 in FIG. 11A. As illustrated in FIG. 12A, in the present embodiment, when the [determination error check] key 71 of the basic copy screen 70 is touched by the user's finger F, and the controller 11 serving as the operation recognizer 11o recognizes, a selection menu of determination items is displayed at a position overlapping the operated key. In the example illustrated in FIG. 12A, a [color/monochrome determination] key 91, a [blank determination] key 92, an [up/down determination] key 93, a [size determination] key 94, and an [OK] key 95 are included in the selection menu of the determination items.

When any of the keys displayed in the selection menu of the determination items is touched, the controller 11 causes the selected key to be highlighted to indicated that the key has been selected. The example in FIG. 12A illustrates a state in which the color/monochrome determination has been selected. FIG. 12B illustrates a state in which the up/down determination has been selected. When the [OK] key 95 is touched, the controller 11 erases the selection menu of the determination items and starts to read the document. While all pages of the document are being read, the [determination error check] key 71 is highlighted to indicate that the page with the highest possibility of erroneous determination is to be previewed.

This is the flow of the processing of previewing the pages having a high possibility of erroneous determination of the selected determination items in the present embodiment.

Third Embodiment

In the first embodiment, as illustrated in FIG. 6, only the image of the entire page is previewed, but it is also possible to further zoom in on areas where there is a high possibility of erroneous determination.

FIG. 13 is a diagram illustrating an example of the preview screen 77 according to the present embodiment. As illustrated in FIG. 13, for a page having a high possibility of erroneous determination, enlarged images 95a and 95b of regions likely to be related to the erroneous determination are displayed adjacent to preview images 79a and 79b, respectively, of the entire page. The region that may be related to the erroneous determination is a portion that is determined to be color pixels on the page that has been determined to be color in the color/monochrome determination. Alternatively, the region that may be related to the erroneous determination is the portion of the non-blank pixels in a page that has been determined to be a blank page in the blank determination.

Fourth Embodiment

In the first to third embodiments, the [start] key 76 as a choice for printing or sending the read document image without previewing it, and the [determination error check] key 71 and the [all image check] key 72 that are choices for previewing the read document image before printing or sending it are presented to the user for selection.

Instead, in the present embodiment, after reading of the document has been finished, the controller 11 causes a choice for whether or not to preview the read document image to appear. According to the present embodiment, the number of pages of the read document image is already known when the choice for previewing is presented. Thus, when the number of pages of the document image is less than a predetermined number of pages, a choice of whether to preview all pages is presented, and when the number of pages is equal to or larger than the predetermined number of pages, only pages that may be subjected to erroneous determination may be previewed. Alternatively, only when the number of pages in the document image is equal to or larger than a predetermined number, the choice for previewing as described in the first to third embodiments may be presented. The predetermined number of pages may be set, for example, to the number of pages that can be displayed in a list as shown in FIG. 6 or 13, or the number of pages may be set and changed by the user.

As described above:

(i) An image reading apparatus according to one aspect of the invention includes a scanner unit that scans a document including a plurality of pages and reads an image of each of the pages; an image processing unit that determines characteristics of each page of the read images and performs image processing in accordance with the characteristics; a display device that previews the processed image of each page; an operation detection device that accepts a setting of an extraction condition related to the characteristics; and a controller that extracts, based on the set extraction condition, and previews a read image of a page having determination accuracy pertaining to the characteristics below a predetermined standard among the images processed for each page.

In one aspect of the invention, the scanner unit reads the images of a document having a plurality of pages. A specific aspect thereof is, for example, the image scanner portion of a multifunction peripheral including a document feeder and image sensor.

The characteristics of an image are a property that provides the basis for determining whether or not to apply a predetermined image processing to the image of each page or determining the parameters to be applied to the image processing.

The image processing unit applies predetermined processing to the images that are read from each page of the document. A specific aspect thereof is, for example, processing for determining whether or not the image on each page is a monochrome image or a color image on the basis of the color/monochrome determination. Alternatively, it is processing for deleting a page determined to be a blank and outputting an image on the basis of the determination of whether or not the page is blank or not. Another aspect is processing for determining the orientation of the document with or without the tilt angle on the basis of the direction of the characters and the alignment of the characters and rotating the image.

The preview displays the image of each page of the document that has been read and processed, on a display device of the image reading apparatus or on an external device capable of communication.

The controller controls the operation of the image reading apparatus. A specific aspect thereof is, for example, a circuit centered on a processor, where the hardware and software work together to realize its function.

Preferred aspects according to the invention will be described.

(ii) The determination accuracy may be calculated as the distance between a feature value extracted from an image to be used for the determination of the characteristics and a threshold value to be used for the determination, and the controller may preview read images of the pages whose calculated distance is smaller than a predetermined standard value.

In this way, the distance between the feature value extracted from the image of each page for performing determination and the threshold value for determination can be used to narrow down the pages whose determination accuracy is below a certain standard.

(iii) The determination pertaining to the characteristics of each page may be at least one of determination whether color or monochrome, determination whether blank or not, determination pertaining to an up-down orientation, and determination pertaining to size determination.

According to this aspect, it is possible to extract and preview pages having a high possibility of erroneous determination for at least one of color/monochrome determination, blank determination, up/down determination pertaining to the up-down orientation, and page size determination, based on the characteristics of the images on each page.

(iv) The controller may accept a setting of an extraction condition which corresponds to a type of the determination and accepts a setting about which determination is to be previewed, via the operation detection device.

In this way, the user can designate which images having a high possibility of erroneous determination for which type of determination are to be narrowed down and previewed.

(v) The controller may accept, via the operation detection device, designation by a user of any of the previewed pages and correction of the determination pertaining to the designated page, preview the corrected image, accept correction or approval of the determination, and outputs or print the approved image as a read image.

In this way, after repeatedly correcting the determination of the previewed page and confirming the corrected result on a preview, an approved image can be output.

(vi) One aspect of the invention includes a method of reading an image performed by a controller, the method including controlling a scanner unit to scan a document including a plurality of pages and reading an image of each of the pages; determining characteristics of each page of the read images and performing image processing in accordance with the characteristics; accepting a setting of an extraction condition related to the characteristics; and extracting, based on the set extraction condition, and previewing a read image of a page having determination accuracy pertaining to the characteristics below a predetermined standard among the images processed for each page.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image reading apparatus comprising:
a scanner unit that scans a document including a plurality of pages and reads an image of each of the plurality of pages;
an image processing unit that determines characteristics of each page of the read images and performs image processing in accordance with the characteristics;
a display device that previews the processed image of each page;
an operation detection device that accepts a setting of an extraction condition related to the characteristics; and
a controller that extracts, based on the set extraction condition, and previews a read image of a page having determination accuracy pertaining to the characteristics below a predetermined standard among the images processed for each page, wherein
the determination pertaining to the characteristics of each page is at least one of determination of color or monochrome, determination of an up-down orientation, and determination of a page size,
the controller further accepts a determination item, selected by a user, from among a plurality of selection items pertaining to a determination of each page that pertains to the characteristics, and previews the read image of the page having the determination accuracy, of the selected determination item, pertaining to the characteristics below the predetermined standard among the images processed for each page.

2. The image reading apparatus according to claim 1, wherein,
the determination accuracy is calculated as a distance between a feature value, extracted from an image, to be used for the determination pertaining to the characteristics and a threshold value to be used for the determination, and
the controller further previews a read image of a page of which the calculated distance is smaller than a predetermined standard value.

3. The image reading apparatus according to claim 1, wherein the controller further accepts a setting of an extraction condition which corresponds to a type of the determination and accepts a setting about which determination is to be previewed, via the operation detection device.

4. The image reading apparatus according to claim 3, wherein the controller further accepts, via the operation detection device, designation by a user of any of the previewed pages and correction of determination pertaining to the designated page, previews the corrected image, accepts correction or approval of the determination, and outputs or prints the approved image as a read image.

5. A method of reading an image performed by a controller, the method comprising:
controlling a scanner unit to scan a document including a plurality of pages and reading an image of each of the plurality of pages;
determining characteristics of each page of the read images and performing image processing in accordance with the characteristics;
accepting a setting of an extraction condition related to the characteristics;
extracting, based on the set extraction condition, and previewing a read image of a page having determination accuracy pertaining to the characteristics below a predetermined standard among the images processed for each page, wherein
the determination pertaining to the characteristics of each page is at least one of determination of color or monochrome, determination of an up-down orientation, and determination of a page size;
accepting, by the controller, a determination item, selected by a user, from among a plurality of selection items pertaining to a determination of each page that pertains to the characteristics; and
previewing, by the controller, the read image of the page having the determination accuracy, of the selected determination item, pertaining to the characteristics below the predetermined standard among the images processed for each page.

6. The image reading apparatus according to claim 1, wherein,
the controller further selectively displays: a first button that extracts and previews the read image of the page having the determination accuracy pertaining to the characteristics below the predetermined standard among the images processed for each page; and a second button that displays all the read images of the pages.

7. The method according to claim 5, further comprising selectively displaying, by the controller: a first button that extracts and previews the read image of the page having the determination accuracy pertaining to the characteristics below the predetermined standard among the images processed for each page; and a second button that displays all the read images of the pages.

* * * * *